Oct. 31, 1950     C. E. HASTINGS     2,527,548
RADIO VELOCITY AND POSITION DETERMINING SYSTEM
Filed March 22, 1945     5 Sheets-Sheet 1
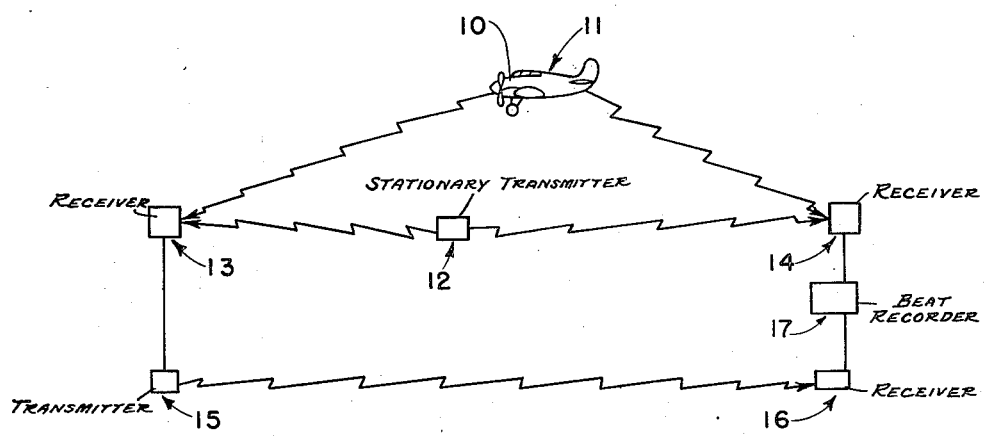
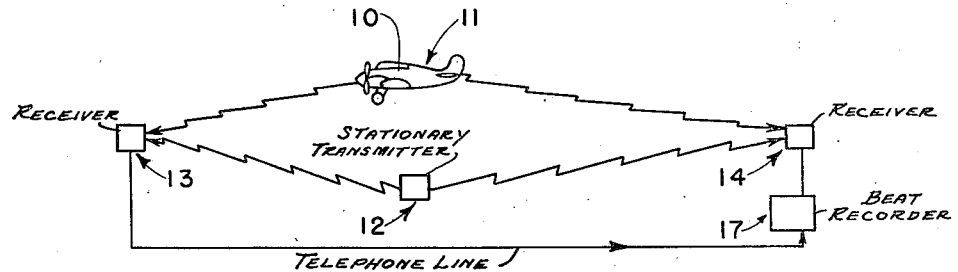
Inventor
CHARLES E. HASTINGS
By Ralph L Chappell
Attorney Oct. 31, 1950     C. E. HASTINGS     2,527,548
RADIO VELOCITY AND POSITION DETERMINING SYSTEM
Filed March 22, 1945     5 Sheets-Sheet 2
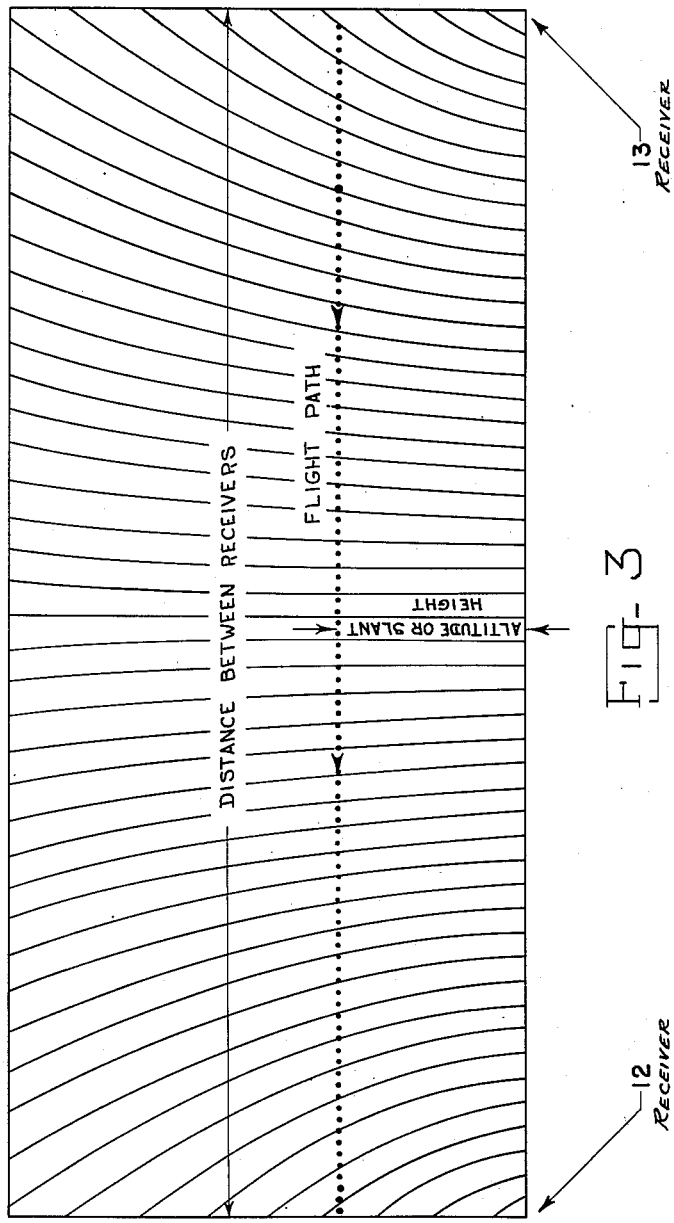
Inventor
CHARLES E. HASTINGS
By Ralph L. Chappell
Attorney Oct. 31, 1950 C. E. HASTINGS 2,527,548
RADIO VELOCITY AND POSITION DETERMINING SYSTEM
Filed March 22, 1945 5 Sheets-Sheet 3

Inventor
CHARLES E. HASTINGS
By Ralph L. Chappell
Attorney

Oct. 31, 1950     C. E. HASTINGS     2,527,548
RADIO VELOCITY AND POSITION DETERMINING SYSTEM
Filed March 22, 1945     5 Sheets-Sheet 5

Inventor
CHARLES E. HASTINGS
Attorney

Patented Oct. 31, 1950

2,527,548

UNITED STATES PATENT OFFICE 2,527,548

RADIO VELOCITY AND POSITION DETERMINING SYSTEM

Charles E. Hastings, Hampton, Va.

Application March 22, 1945, Serial No. 584,221

6 Claims. (Cl. 250—2)

(Granted under the act of March 3, 1883, as amended April 30, 1928; 370 O. G. 757)

This invention relates to a method of and apparatus for measuring the ground speed of and the distance traversed by a moving body in space with respect to two ground locations.

It is an object of this invention to measure with radio signals emanating from a freely moving body the change in frequency due to the Doppler effect and to calibrate this change with known ground speeds.

Another object of this invention is to provide a simple speed determining system using the standard transmitter mounted in an aeroplane, as extreme frequency stability is not necessary.

It is also an object of this invention to measure the traversed distance by the counting of standing wave lengths traveled with reference to two ground positions.

Other objects of this invention are apparent such as multiple systems, which can be used, for example, if one is placed at right angles to the other, the velocity component in each direction can be secured.

These objects are obtained by the mechanism illustrated in the accompanying drawing, in which:

Fig. 1 is a schematic drawing of the radio ground speed system of this invention using a retransmitted signal;

Fig. 2 is likewise a schematic with a telephone line alternative return;

Fig. 3 shows the standing waves between the two receiving ground stations;

Figure 4:
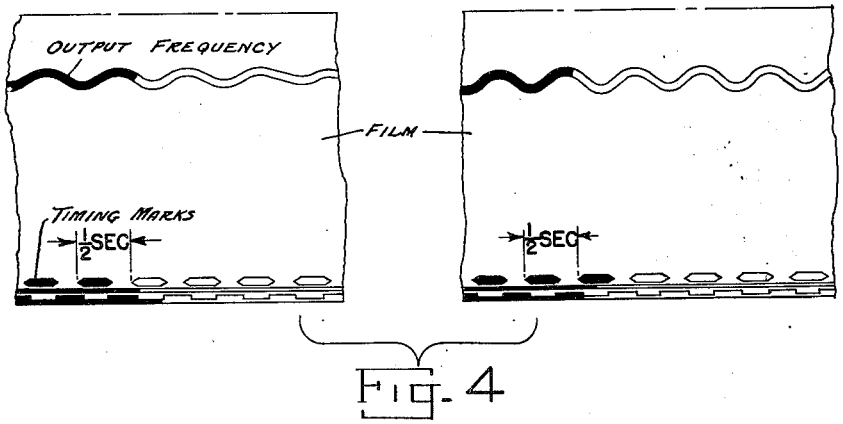
Fig. 4 is time history record made with apparatus shown in Fig. 1.

A transmitter 10 in the aeroplane 11 of which the ground speed is to be measured, transmits a continuous-wave radio-frequency signal, which is heterodyned by a ground station 12. Receivers 13, 14 at each end of the flight path receive this heterodyne note differently because the frequency of the moving transmitter is apparently increased with respect to the end of the course 13 it is approaching and decreased with respect to the end of the course 14 from which it is receding.

By adding the audio-frequency signals, that is, the heterodyne notes received by the two receivers 13, 14, a beat frequency that is proportional to the speed of the aeroplane is obtained. The heterodyne note received at one end of the course can be sent either by wire, Fig. 2, or by radio, Fig. 1, to the opposite end of the course in order that the two signals may be mixed. The radio transmission, shown in Fig. 1, consisting of a transmitter, allows greater flexibility in choosing the course and permits the use of completely mobile equipment; however, a telephone wire is more reliable, requires less equipment, and does not require a second assigned frequency.

As an example, the aeroplane transmitter 10 on a frequency $f_1$ is heterodyned by a ground station 12 operating on a frequency $f_2$. The beat note $(f_1-f_2)$ should be between 30 and 6000 cyles per second in order that standard radio apparatus can be used. If $f_D$ is a frequency equal to the velocity of the aeroplane divided by the wave length of the signal from its transmitter 10, one receiver 13 receives a note $(f_1-f_2-f_D)$ and the other receiver 14 receives a note $(f_1-f_2+f_D)$. The value of $2f_D$ is obtained from the beat between the signals received at the two ends, that is $$(f_1-f_2+f_D)-(f_1-f_2-f_D)=2f_D=$$
$$\frac{2\times\text{velocity of aeroplane}}{\text{wave length of aeroplane transmitter}}$$

Figure 5:
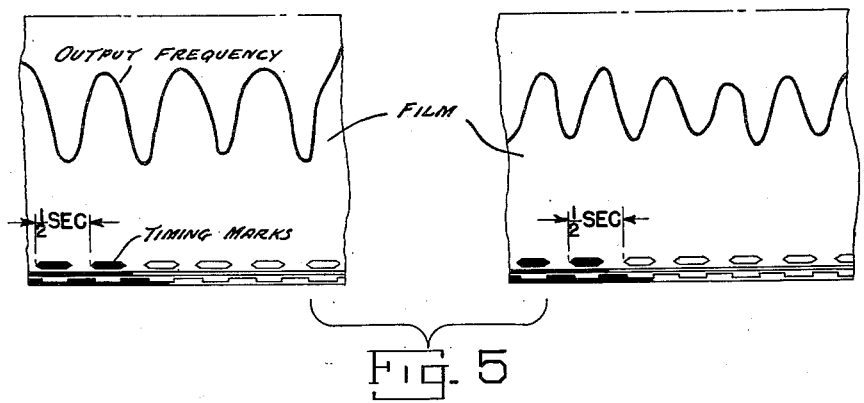
Fig. 5 is time history record made with apparatus shown in Fig. 2.

It should be noted that the first-order effect of frequency drift in either transmitter is cancelled out. The value of $f_D$ depends on the frequency of the transmitter in the aeroplane; however, variations in this frequency will be less than 0.1 per cent even with ordinary equipment, thus eliminating the necessity for stability of an impossibly high order. The stationary transmitter 12 can be at any convenient location on the ground as long as the signal received at both ends 13, 14 of the course does not differ too greatly in intensity from the signal from the aeroplane. As $f_D$ is equal to the velocity of the aeroplane divided by the wave length of the signal from transmitter 10, each cycle represents a distance along the course equal to one-half wave length of the moving transmitter 10. By recording these cycles at 17 along with timing lines, an accurate time-distance record, Figs. 4 and 5, is obtained from which the speed of the aeroplane can be calculated.

If the aeroplane moves in such a way that the change in the distance to both receivers remains constant, no beat frequency will be recorded. This type of flight would be along a hyperbolic path with the receivers at the foci. A family of such hyperbolas which represent what could be considered standing waves as far as the film record is concerned, is shown in Fig. 3. An aeroplane flying along one of the hyperbolas in Fig. 3 will produce no beats between the received signals. When the change in the distance from the aeroplane 11 to one receiver 14 is different from the change in the distance to the second receiver 13 by a distance equal to one wave length of the transmitted signal, Fig. 3, from the aeroplane 11, one complete cycle will be recorded. This method allows several variations in the use of the system.

Figure 6:
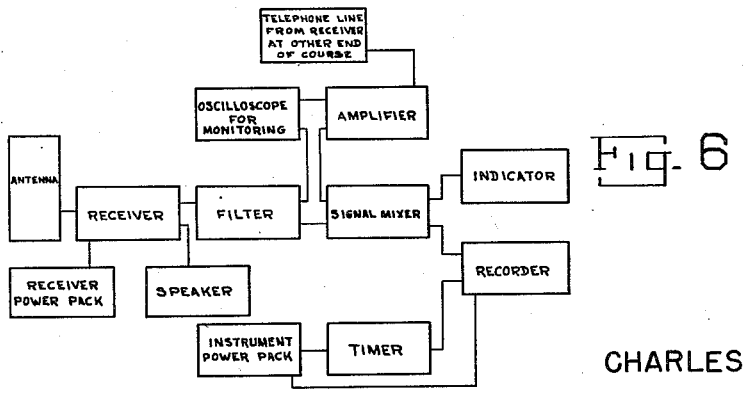
Fig. 6 is block diagram of the radio ground speed apparatus of Fig. 1 with the recorder as used in securing the record shown in Fig. 4.

A block diagram of the recording apparatus 17 is shown in Fig. 6. The antenna receives the heterodyne note (approximately 1,000 C. P. S.) between the stationary ground transmitter and the transmitter in the aeroplane. After detection in the receiver, the signal is filtered and impressed on the signal mixer in which it is mixed with the similar signal that comes from the far end of the course. The signal from the far end of the course is amplified before it is sent to the mixer. The signal amplitudes are controlled by a gain control in the amplifier and the audiogain control in the receiver. A cathode-ray oscilloscope is used to monitor the two signals entering the signal mixer. The output of the signal mixer is a difference frequency between the two input signals and is recorded on film, see Figs. 4 and 5, by a recording galvanometer. A film speed of ½ inch per second is normally used. A chronometric timer is used to put ½ second timing marks on the film.

A 100 watt transmitter is used in the stationary ground transmitter 12. Normally, the transmitter 10 installed in the aeroplane 11 is used.

Figure 7:
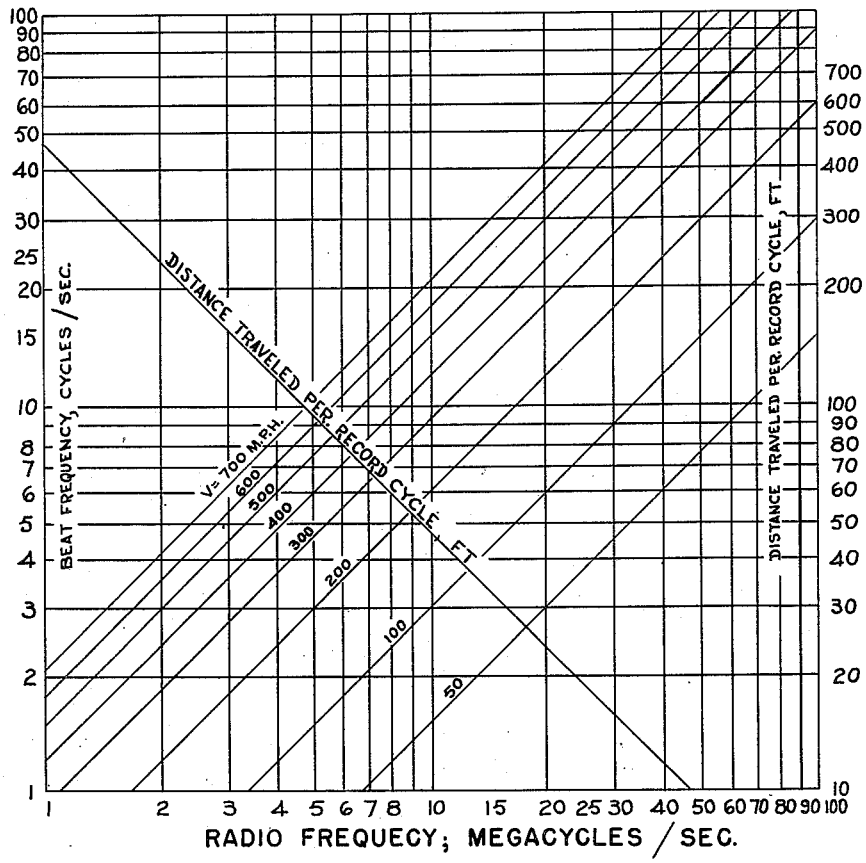
Fig. 7 is a chart for quickly determining the distance per cycle and beat frequency for different radio-frequency signals.

If the aeroplane flies directly between the antennas of the two receivers 13, 14, the beat frequency recorded on Figs. 4 and 5 is directly proportional to the velocity of the aeroplane 11 and the frequency of its transmitter 10. Each recorded cycle will represent a distance traveled equal to one-half the wave length of the transmitted signal. In Fig. 7 the recorded beat frequency and the distance traveled per record cycle are plotted against the frequency of the transmitter 10 in the aeroplane 11 with the speeds of the aeroplane as parameters for the previously given conditions of flight. When the aeroplane is directly between the receivers 13, 14, but flying at an angle with the course, the film record indicates the component of the velocity of the aeroplane along the course. For small angles the cosine is practically 1.00, which causes negligible error because of the inability of the aeroplane to fly a true course. If the aeroplane flies parallel to the line between the receivers but not in the direct line between the receivers, the distance traveled by the aeroplane is greater per record cycle. Plots for correction of direction of flight can be made as well as when the plane is at various distances between the receivers. Plots of altitude correction can also be used. If the ground speed course is used to measure air speeds, the velocity of the wind has to be compensated for. This is usually done by flying in both directions and averaging the differences, as shown in Figs. 4 and 5.

The velocity of the aeroplane and the distance traveled may be calculated from the recorded cycles and the timing cycles, if the direction of flight and the position of the aeroplane are known, by the following equations:

$$V = \frac{n\lambda}{t \cos \psi} \left( \frac{1}{\frac{a}{\sqrt{c^2+a^2}} + \frac{b}{\sqrt{c^2+b^2}}} \right)$$

$$s = \frac{n\lambda}{\cos \psi} \left( \frac{1}{\frac{a}{\sqrt{c^2+a^2}} + \frac{b}{\sqrt{c^2+b^2}}} \right)$$

where $V$, speed of airplane
$s$, distance traveled by airplane
$\lambda$, wave length of transmitter in airplane
$n$, number of record cycles
$t$, time
$\psi$, azimuth angle between the flight path and line between receivers
$c$, perpendicular distance from airplane to line between receivers
$a$ and $b$, distance to receivers from point of intersection of perpendicular from airplane to line between receivers It is assumed that the airplane maintains constant altitude. Any error due to the flight path angle is very small and the error approaches zero very rapidly as the angle becomes small. When the airplane is in the center of the course, the equations simplify to $$V = \frac{n}{2t}$$

$$s = \frac{n}{2}$$

These simple equations can be used as long as the altitude is a small percentage of the distance to either receiver.

It is obvious that by the use of an additional receiver on the ground and by recording the difference between this signal and the signal received by one of the other receivers, the equivalent of a second system of hyperboles is formed. This second system of hyperboles will furnish a means of determining the position of the moving transmitter in a two-dimensional system. Furthermore, it is obvious that the position of the transmitter in space can be calculated by recording a third set of data by adding still another receiver. The only additional equipment required is the fixed stations, the single transmitter is all that is required in the moving aircraft.

The number of recorded cycles per second in any use of the radio ground-speed systems depends directly on the frequency of the radio signal transmitted from the aeroplane. The higher the operating frequency, the shorter the distance the aeroplane must travel to obtain the same number of recorded cycles for the highest accuracy. The distance between the receivers is limited in that the signals received should be the result of direct radiation and not reflected radiation from an ionized layer, since this transmission path may shift with time and introduce small errors.

Figure 8:
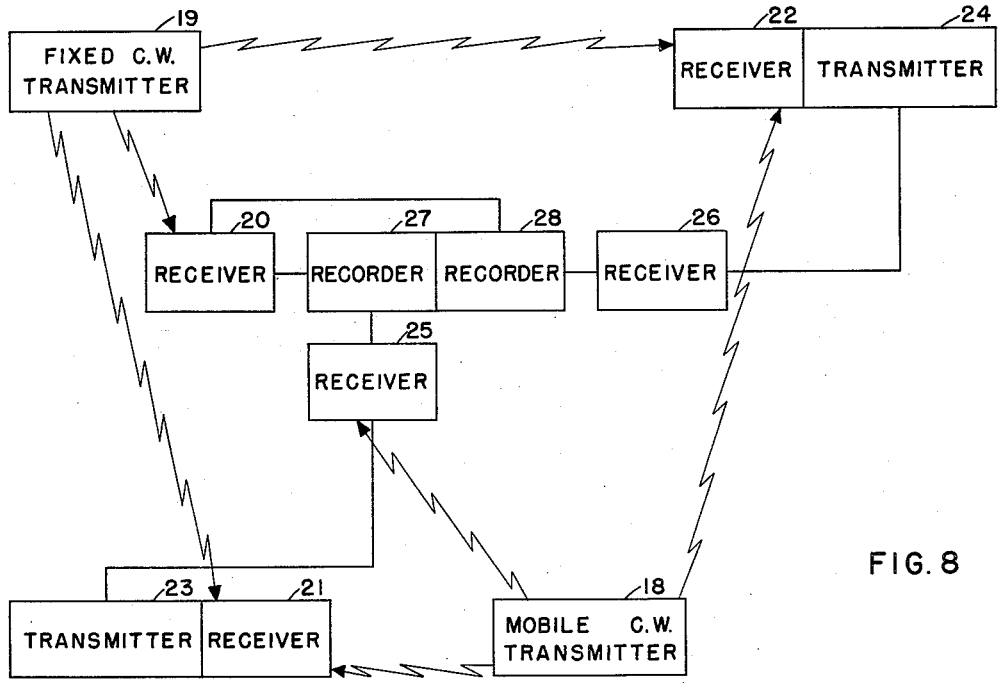
Fig. 8 is a schematic drawing showing a modification of Fig. 1, wherein an additional receiver is used to allow two-dimensional position and velocity to be determined.

Referring to Fig. 8, an additional receiver is used to allow two-dimensional position and velocity to be determined. The mobile transmitter whose position or velocity is to be determined is indicated by reference numeral 18. This transmitter operates on a frequency $F_1$ and is heterodyned by a stationary transmitter 19 operating on a frequency $F_2$. In a manner similar to the operation of the device of Fig. 1, beat frequencies $(F_1-F_2)$ will be received at three locations, namely, at receivers 20, 21, and 22. The signals received at 21 and 22 are returned to the vicinity of receiver 20 by transmitter 23 and transmitter 24 and receivers 25 and 26, respectively. The heterodyned beats received from receivers 21 and 22 at other locations are then compared in recorders 27 and 28 with the signals received at that same location by receiver 20. Each beat between the signal received at 20 and the signals received at 21 and 22 respectively representing a difference in the distance travelled with respect to each pair of receivers.

Figure 9:
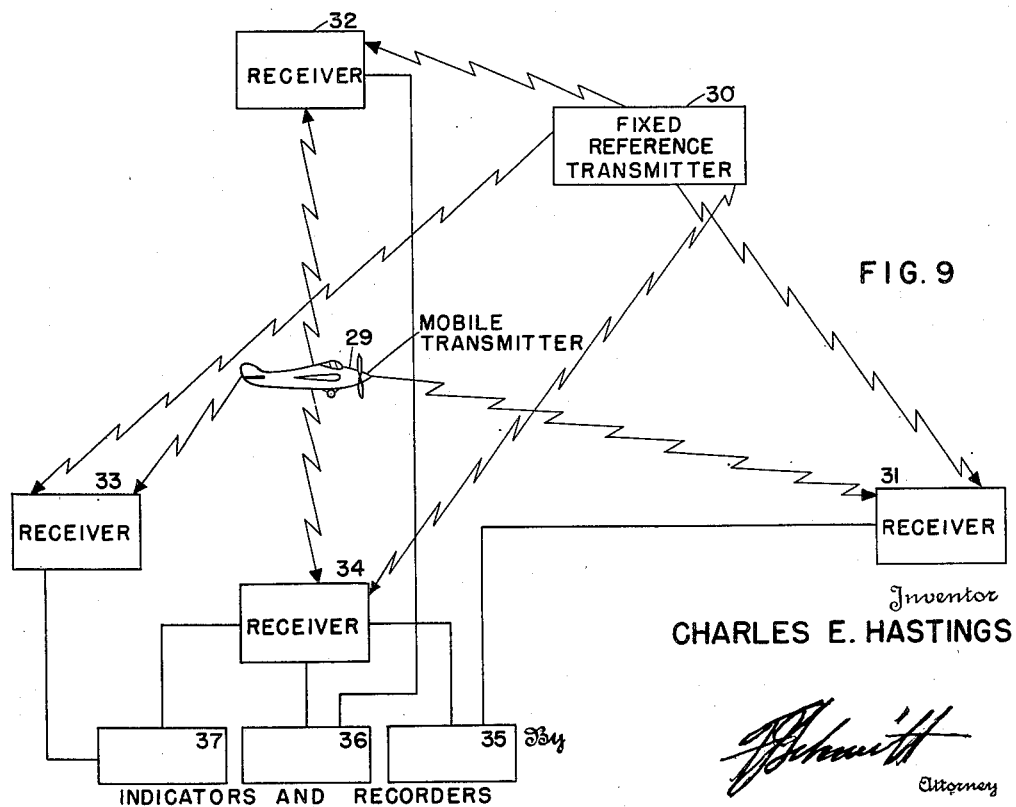
Fig. 9 is a schematic drawing showing a modification of Fig. 1, wherein two additional receivers are used to allow three-dimensional position and velocity to be determined.

Likewise, in Fig. 9 mobile transmitter 29 is heterodyned by fixed reference transmitter 30 and these heterodyned signals are received at three different locations, other than at the master station, by receivers 31, 32, and 33. These signals are returned to receiver 34 and each in turn is compared in indicators and recorders 35, 36 and 37 with the signal received at 34. Thus three-dimensional data are obtained concerning the motion of the airplane in space in terms of hyperbolic coordinates.

The invention described herein may be manufactured and used by or for the Government of the United States of America for governmental purposes without the payment of any royalties thereon or therefor.

What is claimed is:

1. Apparatus of the class described, comprising: a movable source of electromagnetic radiations; a fixed source of electromagnetic radiations; a plurality of fixed receivers of said radiations, including means for combining said received radiations into resulting heterodyne frequencies; means for transmitting said heterodyne frequencies to a common location; and means for combining pairs of said heterodyne frequencies into beats, said beats indicating differences in distance travelled of said moving body with respect to respective pairs of said receiving stations.

2. In a radio system: a fixed and a mobile source of electromagnetic radiations operating on frequencies which differ by a small amount; a plurality of fixed receiving stations which receive the heterodyne note between the two said sources of radiations; means for retransmitting said heterodyne notes to a common location; and means for obtaining the beats between pairs of said heterodyne notes as received in different locations, said beats being a measure of velocity with respect to each respective pair of receiving stations.

3. In a radio system: a fixed and a mobile source of electromagnetic radiations differing in frequency by a sonic frequency; fixed receiving stations which receive the heterodyne note between the two said sources of radiations; means for retransmitting said heterodyne notes to a common location; and means for obtaining the beat between pairs of said heterodyne notes as received in different locations, each said beat representing a change in the difference in distance to the respective pair of receiving stations.

4. An apparatus of the class described, comprising: a movable source of electromagnetic radiations; a fixed source of electromagnetic radiations; a pair of fixed receivers each having means for receiving and heterodyning said radiations; means at each receiver for transmitting the heterodyned frequencies; and a common receiving station for receiving said heterodyned frequencies; said station including means for beating said heterodyne frequencies and frequency indicating means responsive to the beat frequency.

5. Apparatus of the class described, comprising: a movable source of electromagnetic radiations; a fixed source of electromagnetic radiations; a pair of spaced receiving stations each having means for receiving the radiations from said sources and heterodyning the same; and means for combining the heterodyned frequencies.

6. Apparatus of the class described, comprising: a movable source of electromagnetic radiations; a fixed source of electromagnetic radiations; a pair of spaced receivers each having means for receiving and heterodyning said radiations; means at each receiver for transmitting the heterodyned frequencies; and means for receiving said heterodyned frequencies, said last-named means including means for combining said heterodyned frequencies.

CHARLES E. HASTINGS.

REFERENCES CITED

The following references are of record in the file of this patent:

UNITED STATES PATENTS

| Number | Name | Date |
|---|---|---|
| 1,639,667 | Ranger | Aug. 23, 1927 |
| 1,945,952 | Nicholson | Feb. 6, 1934 |
| 2,050,276 | Chubb | Aug. 11, 1936 |
| 2,083,945 | Evans | June 15, 1937 |
| 2,148,267 | Honore | Feb. 21, 1939 |
| 2,198,113 | Holmes | Apr. 23, 1940 |
| 2,301,929 | Budenbom | Nov. 17, 1942 |